United States Patent [19]

Roth

[11] Patent Number: 5,700,955

[45] Date of Patent: Dec. 23, 1997

[54] PRECISION THICKNESS VARIATION MAPPING VIA ONE-TRANSDUCER ULTRASONIC HIGH RESOLUTION PROFILOMETRY FOR SAMPLE WITH IRREGULAR OR ROUGH SURFACE

[75] Inventor: Don J. Roth, Lakewood, Ohio

[73] Assignee: United States of America as represented by the Administrator of the National Aeronautics and Space Administration, Washington, D.C.

[21] Appl. No.: 641,132

[22] Filed: Apr. 22, 1996

[51] Int. Cl.⁶ ............................................. G01H 5/00
[52] U.S. Cl. ......................... 73/597; 73/602; 73/620; 73/627; 73/663; 364/563
[58] Field of Search .................. 73/597, 602, 618, 73/620, 627, 644, 663; 367/95, 99, 103, 104; 364/561, 563

[56] References Cited

U.S. PATENT DOCUMENTS

| | | |
|---|---|---|
| 3,688,569 | 9/1972 | Murdoch ................................. 73/105 |
| 4,049,954 | 9/1977 | Da Costa Vieira et al. ...... 235/151.32 |
| 4,056,970 | 11/1977 | Sollish ................................... 73/629 |
| 4,167,180 | 9/1979 | Kossoff ............................... 128/660 |
| 4,574,637 | 3/1986 | Adler .................................... 73/629 |
| 4,719,605 | 1/1988 | Eder et al. ............................ 367/98 |
| 4,976,149 | 12/1990 | Ichikawa ............................. 73/597 |
| 5,054,321 | 10/1991 | Horvath .............................. 73/597 |
| 5,062,297 | 11/1991 | Hashimoto ......................... 73/597 |
| 5,173,692 | 12/1992 | Shapiro .............................. 340/943 |
| 5,280,719 | 1/1994 | Noss ................................... 73/146 |
| 5,440,929 | 8/1995 | Huang ................................. 73/628 |

*Primary Examiner*—Hezron E. Williams
*Assistant Examiner*—Richard A. Moller
*Attorney, Agent, or Firm*—Kent N. Stone

[57] ABSTRACT

An apparatus and method for determination of sample thickness and surface depression utilizing ultrasonic pulses. The sample is held in a predetermined position by a support member having a reference surface. Ultrasonic pulses travel through a medium of known velocity propagation and reflect off the reference surface and a sample surface. Time of flight data of surface echoes are converted to distances between sample surfaces to obtain computer-generated thickness profiles and surface mappings.

20 Claims, 4 Drawing Sheets

PRECISION THICKNESS VARIATION MAPPING VIA ONE-TRANSDUCER ULTRASONIC HIGH RESOLUTION PROFILOMETRY FOR SAMPLE WITH IRREGULAR OR ROUGH SURFACE

BACKGROUND OF THE INVENTION

1. Field of Invention

This invention pertains to the art of methods and apparatuses for mapping profiles of irregularly surfaced samples of various materials, and more specifically to methods and apparatuses for thickness variation mapping using ultrasonic high-resolution profilometry.

2. Description of the Related Art

Samples that have rough or irregular surfaces can be difficult at times to characterize for thickness variation. One possible method is known as diamond-tipped profilometry. This method, however, requires contact with the sample which can cause undesirable alterations to the sample surface if further characterization is required. Another profilometry method potentially useable for precision thickness measuring uses lasers. However, this method requires specularly reflecting surfaces for accurate measurements.

Ultrasonic methods are also currently available for thickness measurements. Such methods require the ultrasonic energy to travel through the mass of the sample. However, because of the high frequencies required for precise, high-resolution characterization, penetration of the ultrasonic energy can be very difficult or even impossible to obtain. Further, in the latter method, it is generally required that the ultrasonic velocity in the material be known and assumed to be constant. Unless the material is perfectly homogenous, the necessary assumption gives less than desirable results.

Another known ultrasonic method for thickness measurement requires two transducers, a contact measurement, and volumetric ultrasonic travel. The method is significantly more complicated to implement than the method disclosed herein.

SUMMARY OF THE INVENTION

In accordance with the practice of the present invention, there is provided a method and apparatus for precision thickness variation mapping utilizing non-contact, ultrasonic means.

More particularly, in accordance with the present invention, the method employs a single transducer to obtain time delay data for ultrasonic pulses reflected from a sample surface.

According to one aspect of the present invention, a method for determining the perpendicular distance between first and second surfaces of a sample comprises the steps of:

(a) transmitting a reference ultrasonic signal through an ultrasonic medium having a known velocity of propagation, $V_{med}$, to a reference surface a constant distance from a transducer able to send and receive ultrasonic signals, said second surface of said sample interfacing with said reference surface whereby said second surface and said reference surface are the same constant distance from said transducer;

(b) receiving a reference ultrasonic echo from said reference surface;

(c) transmitting a first ultrasonic signal through said medium to a first location on said first surface;

(d) receiving a first ultrasonic echo with said transducer from said first location;

(e) recording time delay data from the transmission of said signals to the reception of said echoes; and, (f) calculating said perpendicular distance from said time delay data and said ultrasonic velocity.

According to another aspect of the present invention, a method for obtaining a thickness profile between a first surface and an opposite planar second surface of a sample comprises the steps of:

(a) positioning said sample on a support member within an immersion tank, said support member having a uniform thickness and a planar reference surface so that said second surface interfaces with said reference surface of a said support member in a first plane, the immersion tank containing an ultrasonic medium of known ultrasonic velocity;

(b) scanning said reference surface and a plurality of locations on said first surface with ultrasonic pulses transmitted from a transducer maintained in a second plane a constant distance from said first plane, said ultrasonic pulses travelling through said medium, each of said locations being associated with a pair of x-y coordinates;

(c) receiving echoes of said ultrasonic pulses off said reference surface and said first surface in the form of time delay data;

(d) converting said time delay data to thickness map data for each echo received from said plurality of locations on said first surface; and, (e) using said thickness map data to generate a thickness profile of said sample.

According to another aspect of the invention, an apparatus for measuring a plurality of perpendicular distances between first and second opposite surfaces of a sample comprises:

a support member having a flat reference surface lying in a first plane, said second surface of said sample interfacing with said reference surface so that said second surface lies in said second plane;

scanning means for scanning said reference surface and said first surface by moving an ultrasonic transducer in a second plane, said second plane being a constant distance from said first plane, said transducer being capable of emitting ultrasonic pulses at a predetermined frequency and receiving ultrasonic echoes;

an immersion fluid of known velocity of propagation disposed between said transducer and said support member;

means for recording time delay data between the emission of an ultrasonic pulse and the reception of an echo; and, means for converting said time delay data into said perpendicular distances.

One advantage of the present invention is amount of data in a short length of time. For example, about 10 times the data can be obtained in 1/100th the time over diamond-tip profilometry.

Another advantage of the present invention is the elimination of sample contact with the measuring device.

Another advantage of the present invention is the elimination of the need for ultrasonic penetration of the sample thereby eliminating the need to know or assume the speed of sound therethrough.

Another advantage of the present invention is the precision measurement of the thickness profile obtained by the method disclosed herein.

Another advantage of the present invention is the ability to obtain surface profiling over the entire sample.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
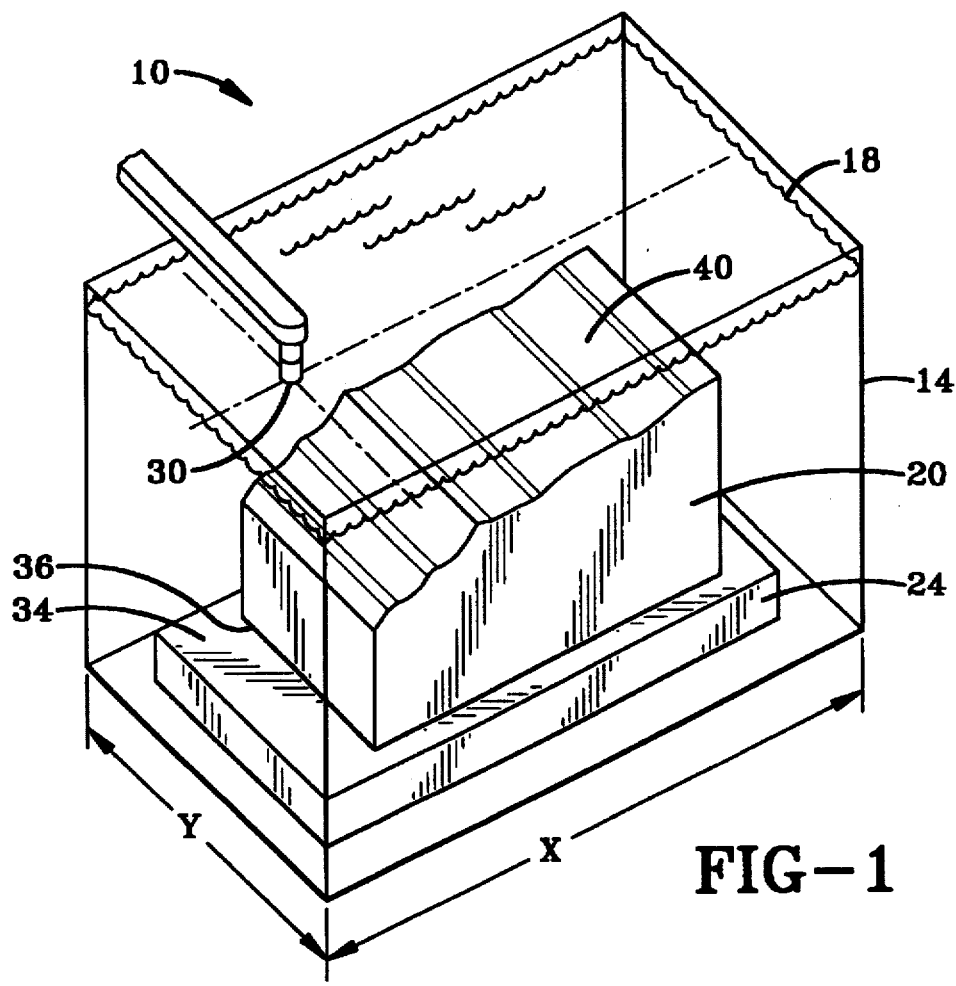
FIG. 1 is a perspective view of an assembly for ultrasonic profilometry for thickness variation determination according to the invention.

Referring now to the drawings wherein the showings are for purposes of illustrating a preferred embodiment of the invention only and not for purposes of limiting the same, FIG. 1 shows a perspective view of an assembly for ultrasonic profilometry for thickness variation determination, hereinafter assembly 10. Generally, assembly 10 includes a tank 14 for holding an immersion medium 18. The sample 20 rests on a support member 24 within medium 18. A transducer 30 sends an ultrasonic signal through the medium 18 which reflects off sample 20. The return signal is received by the transducer 30. The lapse of time from signal generation to echo reception is related to the distance traveled by the signal. The method of the present invention further requires an ultrasonic scan system and an oscilloscope with accurate time base and time synthesis capability (the ultrasonic scan system and oscilloscope are not shown).

Figure 2:
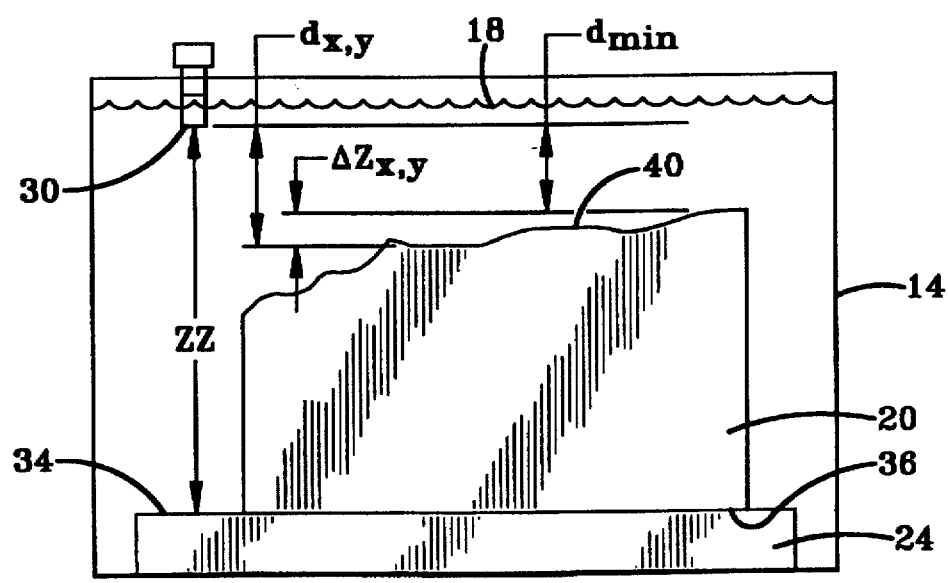
FIG. 2 is a front view of the assembly of FIG. 1.

With reference to FIG. 2, support member 24 comprises a uniform thickness and a flat upper surface or reference surface 34 which lies in a first x-y plane. Transducer 30 is moveable in a second x-y plane a constant distance ZZ from the upper surface 34 of support member 24. Sample 20 includes a flat lower surface 36 which is flush against upper surface 34 of the support member 24. When an ultrasonic scan is made over sample 20, at any location (x,y) on the upper surface 40 of the sample 20, the distance between the upper surface 40 and the transducer is given by, $d_{x,y}$. The thickness of the sample at location (x,y) is then the difference between ZZ and $d_{x,y}$:

$$Thickness_{x,y} = ZZ - d_{x,y}$$

It is readily apparent, that Thickness$_{x,y}$ is a measure of the perpendicular distance from upper surface 40 to lower surface 36 at the x-y location.

Figure 3:
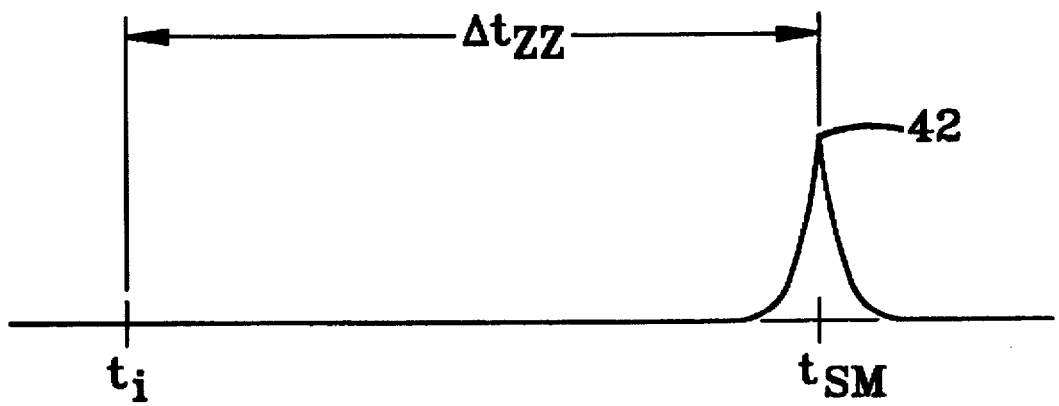
FIG. 3 is a representation of a time location of an ultrasonic reflection off the upper surface of the support material.

The distance, ZZ, can be determined by:

$$ZZ = \frac{V_{med} * \Delta t_{zz}}{2}$$

where water is the immersion medium, $V_{med}$ is the velocity of sound in water, and:

$$\Delta t_{zz} = t_{SM} - t_i$$

where $t_{SM}$ is the time location of the peak of the first ultrasonic reflection off the upper surface 34 of support member 24 and $t_i$ is the time location of the pulse initially leaving the transducer 30. FIG. 3 shows a representation of a time location peak 42 as might be recorded on an oscilloscope.

Figure 4:
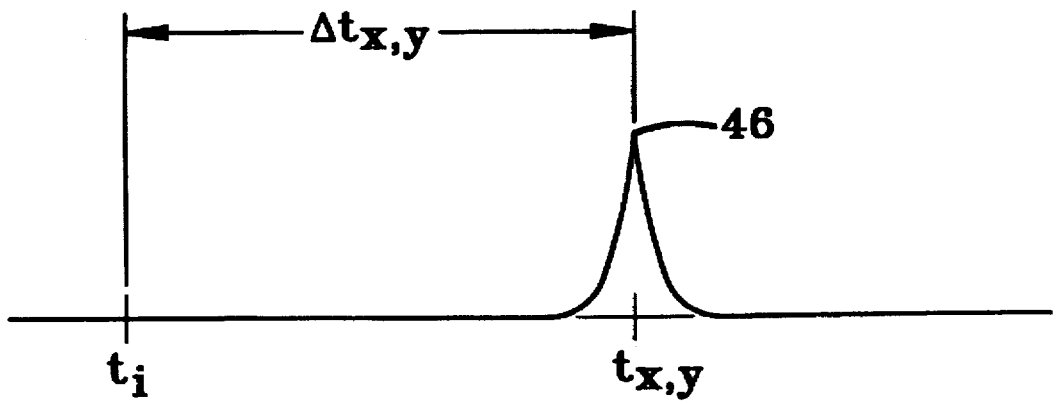
FIG. 4 is a representation of a time location of an ultrasonic reflection off the upper surface of the sample at any given location, (x,y).

In like manner, distance $d_{x,y}$ can be determined by:

$$d_{x,y} = \frac{V_{med} * \Delta t_{d_{x,y}}}{2}$$

where:

$$\Delta t_{d_{x,y}} = t_{x,y} - t_i$$

corresponding to the time location peak 46 as shown in FIG. 4.

The thickness of sample 20 at each (x,y) location can thus be determined by inserting equations (2) and (4) into equation (1):

$$Thickness_{x,y} = \left[ \frac{V_{med} * \Delta t_{zz}}{2} \right] - \left[ \frac{V_{med} * \Delta t_{d_{x,y}}}{2} \right]$$

and inserting equations (3) and (5) into equation (6):

$$Thickness_{x,y} = \left[ \frac{V_{med} * (t_{SM} - t_i)}{2} \right] - \left[ \frac{V_{med} * (t_{x,y} - t_i)}{2} \right]$$

Canceling terms and factoring equation (7) gives:

$$Thickness_{x,y} = \frac{V_{med}}{2} * (t_{SM} - t_{x,y})$$

The surface depression at any x,y location can be obtained in like manner:

$$\Delta Z_{x,y} = \frac{V_{med}}{2} * (t_{x,y} - t_{min})$$

where tmin is the echo time corresponding to the highest surface position of upper surface 40.

Because $V_{med}$ is greatly temperature dependent, the medium temperature should be measured accurately.

Transducer focal spot size determines the sample area of the sample surface 40 at each (x,y) location. Relationships exist between focal spot size, transducer frequency and focal length for transducers. In one preferred embodiment of the present invention, it has been found that using a 100 MHz center frequency focused transducer with a focal length of 0.5 inches (1.27 cm) results in a focal spot size of 25–50 μm. Another preferred embodiment of the invention utilizes a broad band focused 50 MHz transducer with a focal length of 0.5 inches (1.27 cm), with a focal spot size of 50–100 μm.

Resolution of thickness variation is a function of how finely time variation can be resolved and is dependent on analog-to-digital sampling rate and the number of bits available to which a time extent can be mapped.

Although the preferred embodiment of the present invention utilizes water as the immersion medium, other media may be employed as long as the velocity of sound therein is precisely determined.

In addition to the velocity of sound in the immersion medium, it is important to precisely measure $t_{x,y}$ and $t_{SM}$. The system should also be free from external vibration and preferably include a high digital sampling rate (1 GHz) of the ultrasonic A/D converter.

The following example of the implementation of the inventive method is given for clarification and is not intended to limit the invention.

EXAMPLE

A map over a sample of ultrasonic time delay data was obtained using a commercially available ultrasonic scan system manufactured by Sonix, Inc. A broadband focused 50 MHz transducer with focal length =1.27 cm (0.5 in.), focal spot size ~ 50–100 µm and 1 GHz analog-to-digital sampling rate were used. Water temperature was measured and maintained at 69° F. Gate length was set to cover the entire time extent corresponding to the thickness variation being tracked. A computer program converted the time delay data to thickness map data.

Specifically, the equation used to obtain Thickness$_{x,y}$ from time delay data is:

$$Thickness_{x,y}(mm) = \frac{V_{med}(mm/\mu sec)}{2} * (T_{SM} - (TOF_{start} + (TOF_{increment})(graylevel_{x,y})))$$

where:

$$TOF_{increment} = \left(\frac{1}{sampling\ rate}\right) * \frac{gate\ length(points)}{(248\ gray\ levels)}$$

where:

$$\frac{1}{sampling\ rate} = \frac{gate\ length(\mu sec)}{gate\ length(points)}$$

According to present Sonix convention, TOF$_{increment}$ and TOF$_{start}$ have units of microseconds and are obtained from the header of the Sonix image file after converting to ascii text file. TOF$_{start}$ corresponds to the right end position of the gate. Graylevel x,y which is the gray level value obtained at scan loction x,y and is a value between 0 and 248 (8 bits of TOF resolution), increases as TOF decreases. The 248 gray levels represent ~ 8 bits of resolution mapping available in the commercial scan system. As is readily apparent, ultrasonic digital system design and experimental variables have significant effects on the resolution of thickness variations. These variable include: transducer frequency, transducer spot size, sampling rate, gate length, maximum sampling rate, and number of available gray levels (or bits=log$_2$ gray levels).

Figure 5:
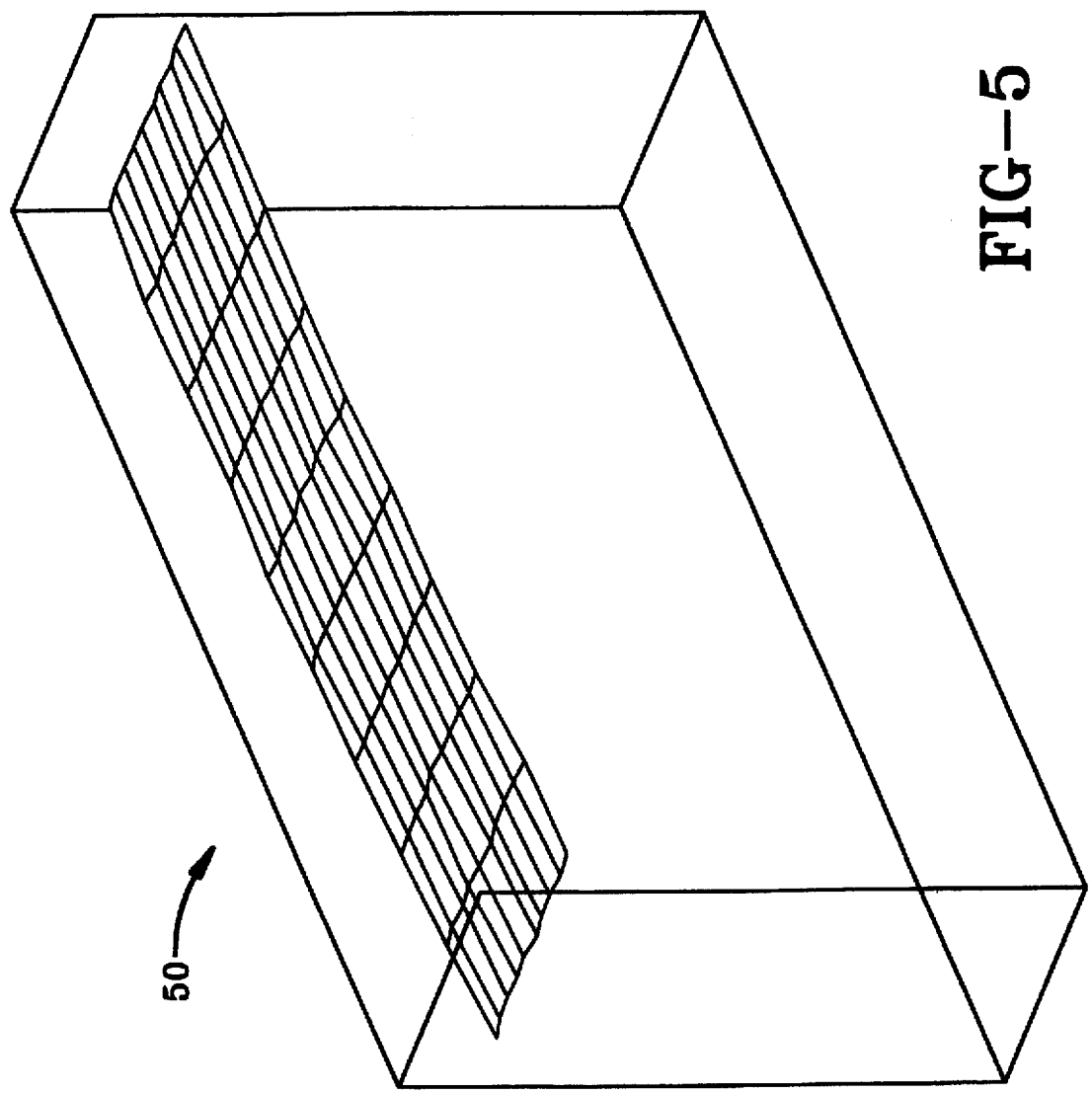
FIG. 5 is an ultrasonic thickness profile of a sample before burning obtained by the method of the present invention.
Figure 6:
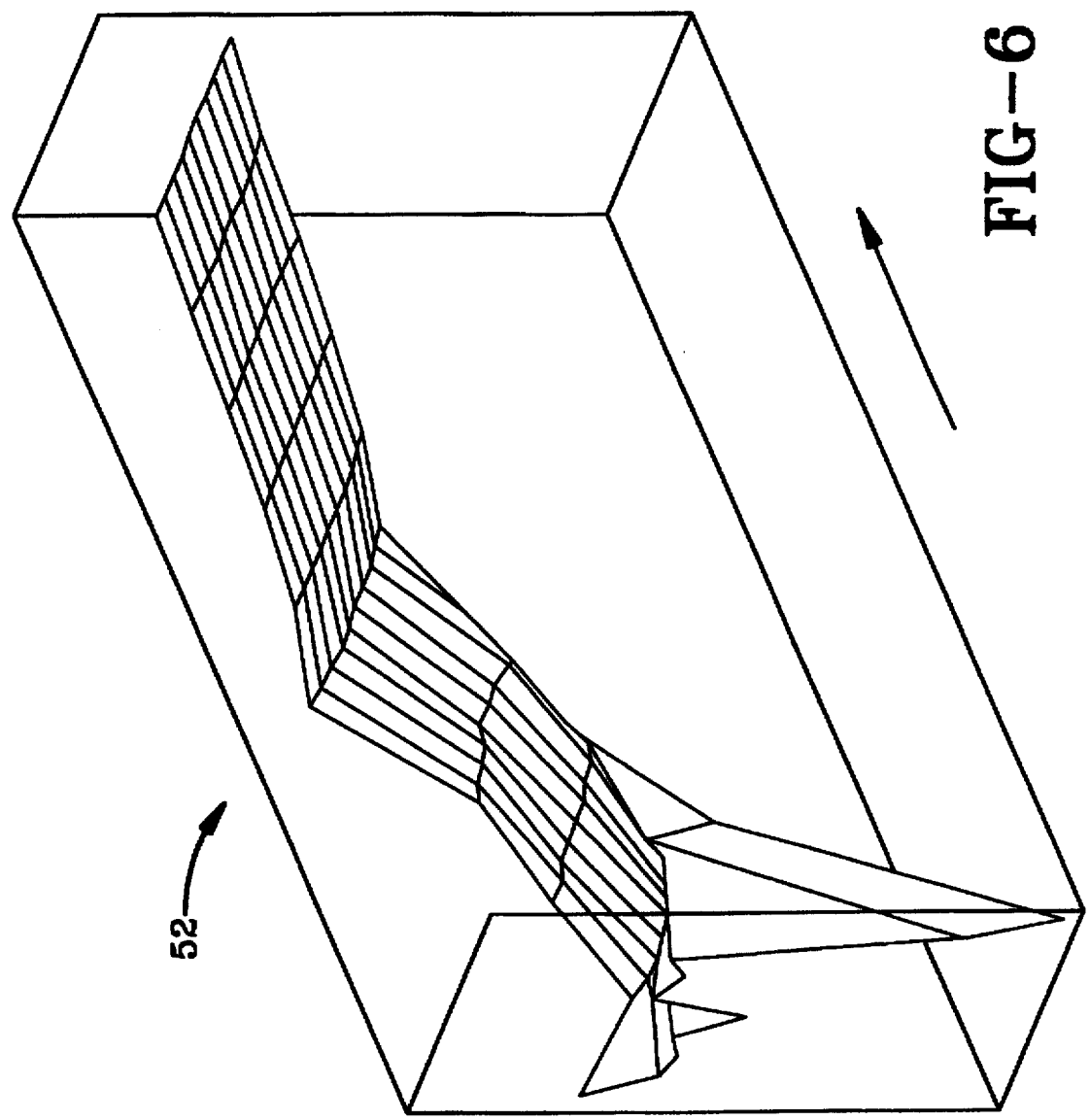
FIG. 6 is an ultrasonic thickness profile obtained by the method of the present invention after burning the sample of FIG. 5.

The resulting data in the form of x (position), y (position), and z (thickness) was imported into a 3-dimensional plotting program. Two such programs to plot thickness data include TableCurve 3D from Jandel Scientific and PVWave from Precision Visuals. FIGS. 5 and 6 show representations of 3-dimensional computer generated sample thickness profiles before and after the sample was burned. In FIG. 5, the representation 50 indicates the sample thickness profile before burning and in FIG. 6 representation 52 indicates the sample thickness after burning.

With reference again to FIG. 2, a method for obtaining a surface depression mapping will now be described. The minimum distance, d$_{min}$, from the upper surface 40 of the sample to the second x-y plane corresponds to the (x,y) location where the ultrasonic echo yields a minimum value, t$_{min}$. The difference between d$_{x,y}$ and drain yields the surface depression $\Delta Z_{x,y}$ at any location (x,y). With the Sonix, Inc. system a surface depression mapping may be obtained by using the following relationship:

$$\Delta Z_{x,y}(mm) = \frac{V_{med}(mm/\mu sec)}{2} * (TOF_{increment}) * (graylevel_{x,y} - graylevel_{max})$$

Graylevel$_{max}$ is the maximum gray level value in the file of data values obtained for the scan.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method for determining the perpendicular distance between first and second opposite surfaces of a sample located on a support member, said support member having a flat reference surface which is flush with said second surface of said sample, said method comprising the steps of:

(a) transmitting a reference ultrasonic signal through an ultrasonic medium having a known velocity of propagation, V$_{med}$, to said flat upper surface of said support member which is a constant distance from a single transducer able to send and receive ultrasonic signals, said second surface of said sample flush with said flat upper surface of said support member whereby said second surface and said flat upper surface are the same constant distance from said transducer;

(b) receiving a reference ultrasonic echo from said flat upper surface of said support member;

(c) transmitting a first ultrasonic signal through said medium to a first location on said first surface;

(d) receiving a first ultrasonic echo with said transducer from said first location;

(e) recording time delay data between the transmission of said signals to the reception of said reference ultrasonic echo and said first ultrasonic echo;

(f) calculating said perpendicular distance from said time delay dam and said ultrasonic velocity whereby said thickness is not determined by propagating said reference signal through said sample.

2. The method of claim 1 wherein the step of calculating said perpendicular distance from said time delay data and said ultrasonic velocity utilizes the equation:

where:

V$_{med}$ is the propagation velocity, t$_{SM}$ is the time location of the peak of said reference echo, and t$_{x,y}$ is the time location of the peak of said first ultrasonic echo.

3. The method of claim 1 wherein said medium is water.

4. The method of claim 1 said wherein said transducer has a focal length of approximately 0.5 inches (1.27 cm) and a focal spot size of ~ 50–100 µm.

5. The method of claim 1 wherein said transducer has a focal length of approximately 0.5 inches (1.27 cm) and a focal spot size of 25–50 µm.

6. The method of claim 1 wherein the frequency of said ultrasonic signals is in the range of 50–100 MHz.

7. A method for obtaining a thickness profile between a first surface and an opposite planar second surface of a sample comprising the steps of:

(a) positioning said sample on a support member within an immersion tank, said support member having a uniform thickness and a planar reference surface so that said second surface is flush with said reference surface of a said support member in a first plane, the immersion tank containing an ultrasonic medium of known ultrasonic velocity;

(b) scanning said reference surface and a plurality of locations on said first surface with ultrasonic pulses transmitted from a single transducer maintained in a second plane a constant distance from said first plane, said ultrasonic pulses traveling through said medium, each of said locations being associated with a pair of x-y coordinates;

(c) receiving echoes of said ultrasonic pulses off said reference surface and said first surface in the form of time delay data;

(d) converting said time delay data to thickness map data for each echo received from said plurality of locations on said first surface; and, (e) using said thickness map data to generate a thickness profile of said sample.

8. The method of claim 7 wherein the step of scanning said reference surface and said first surface with ultrasonic pulses from a transducer comprises:

using a 1 GHz analog-to-digital sampling rate.

9. The method of claim 7 wherein said step of converting said time delay data to thickness map data utilizes the following relationship:

$$Thickness_{x,y} = \frac{V_{med}}{2} * (t_{SM} - t_i)$$

where:

$V_{med}$ is the ultrasonic velocity in said medium, $t_{SM}$ is the time location of the peak of the echo off said reference surface, and $t_{x,y}$ is the time location of the peak of the echo off any of said plurality of locations on said first surface, whereby each pair of x-y coordinates has an associated $Thickness_{x,y}$.

10. The method of claim 9 wherein said step of using said thickness map data to generate a thickness profile of said sample comprises:

feeding said x-y coordinates and said associated $Thickness_{x,y}$ into means for plotting three dimensional data.

11. The method of claim 7 wherein said medium is water.

12. The method of claim 7 said wherein said transducer has a focal length of approximately 0.5 inches (1.27 cm) and a focal spot size of ~50–100 μm.

13. The method of claim 7 wherein said transducer has a focal length of approximately 0.5 inches (1.27 cm) and a focal spot size of 25–50 μm.

14. The method of claim 7 wherein the frequency of said ultrasonic signals is in the range of 50–100 Mhz.

15. An apparatus for measuring a plurality of perpendicular distances between first and second opposite surfaces of a sample, the apparatus comprising:

a support member having a flat reference surface of uniform thickness lying in a first plane, said second surface of said sample having a flat lower surface which is flush with said reference surface so that said second surface lies in a second plane;

scanning means for scanning said reference surface and a plurality of locations on said first surface by moving an ultrasonic transducer in said second plane, each of said locations being associated with a pair of x,y coordinates, said transducer being capable of emitting ultrasonic pulses at a predetermined frequency and receiving ultrasonic echoes;

a tank for holding an immersion medium;

an immersion medium of known velocity of propagation disposed between said transducer and said support member;

an oscilloscope having accurate time base and time synthesis capability;

means for recording time delay data between the emission of an ultrasonic pulse and the reception of an echo; and, means for converting said time delay data into said perpendicular distances, whereby said measurement of plurality of perpendicular distances is not determined by propagating said reference signal through said sample.

16. The apparatus of claim 15 wherein said frequency is in the range of 50 Mhz to 100 Mhz.

17. The apparatus of claim 15 wherein said transducer has a predetermined focal length.

18. The apparatus of claim 15 wherein said scanning means has a predetermined sampling rate.

19. The apparatus of claim 15 wherein said means for converting said time delay data into said perpendicular distances utilizes the relationship:

$$Thickness_{x,y} = \frac{V_{med}}{2} * (t_{SM} - t_i)$$

where:

$V_{med}$ is the ultrasonic velocity in said medium, $t_{SM}$ is the time location of the peak of the echo off said reference surface, and $t_{x,y}$ is the time location of the peak of the echo off any of said plurality of locations on said first surface, whereby each pair of x-y coordinates has an associated $Thickness_{x,y}$.

20. A method for determining the thickness of a sample, said thickness being a perpendicular distance between a first and a second opposite surfaces of said sample, said method comprising the steps of:

(a) transmitting a reference ultrasonic signal through an ultrasonic medium having a known velocity of propagation, $V_{med}$, to a reference surface, said reference surface being planar and a certain distance from an originating point of said reference ultrasonic signal, said second surface of said sample lying in a plane which is parallel to and a known distance from said reference surface;

(b) receiving a reference ultrasonic echo from said reference surface;

(c) transmitting a first ultrasonic signal through said medium to a first location on said first surface of said sample;

(e) receiving a first ultrasonic echo from said first location;

(f) recording a time delay from said transmission of said reference ultrasonic signal to said reception of said first ultrasonic echo;

(g) calculating said thickness of said sample by calculating a distance between said first and second opposite surfaces of said sample from said time delay data, said ultrasonic velocity, whereby said thickness is not determined by propagating said reference signal through said sample.

* * * * *